June 21, 1955     J. R. ORELIND     2,711,065
TRACTOR MOUNTED SIDE DELIVERY RAKE
Filed Dec. 18, 1953     4 Sheets-Sheet 2

INVENTOR.
John R. Orelind
BY
Atty.

June 21, 1955 — J. R. ORELIND — 2,711,065
TRACTOR MOUNTED SIDE DELIVERY RAKE
Filed Dec. 18, 1953 — 4 Sheets-Sheet 3

INVENTOR.
John R. Orelind
BY Paul O. Pippel
Atty.

June 21, 1955  J. R. ORELIND  2,711,065
TRACTOR MOUNTED SIDE DELIVERY RAKE
Filed Dec. 18, 1953  4 Sheets-Sheet 4
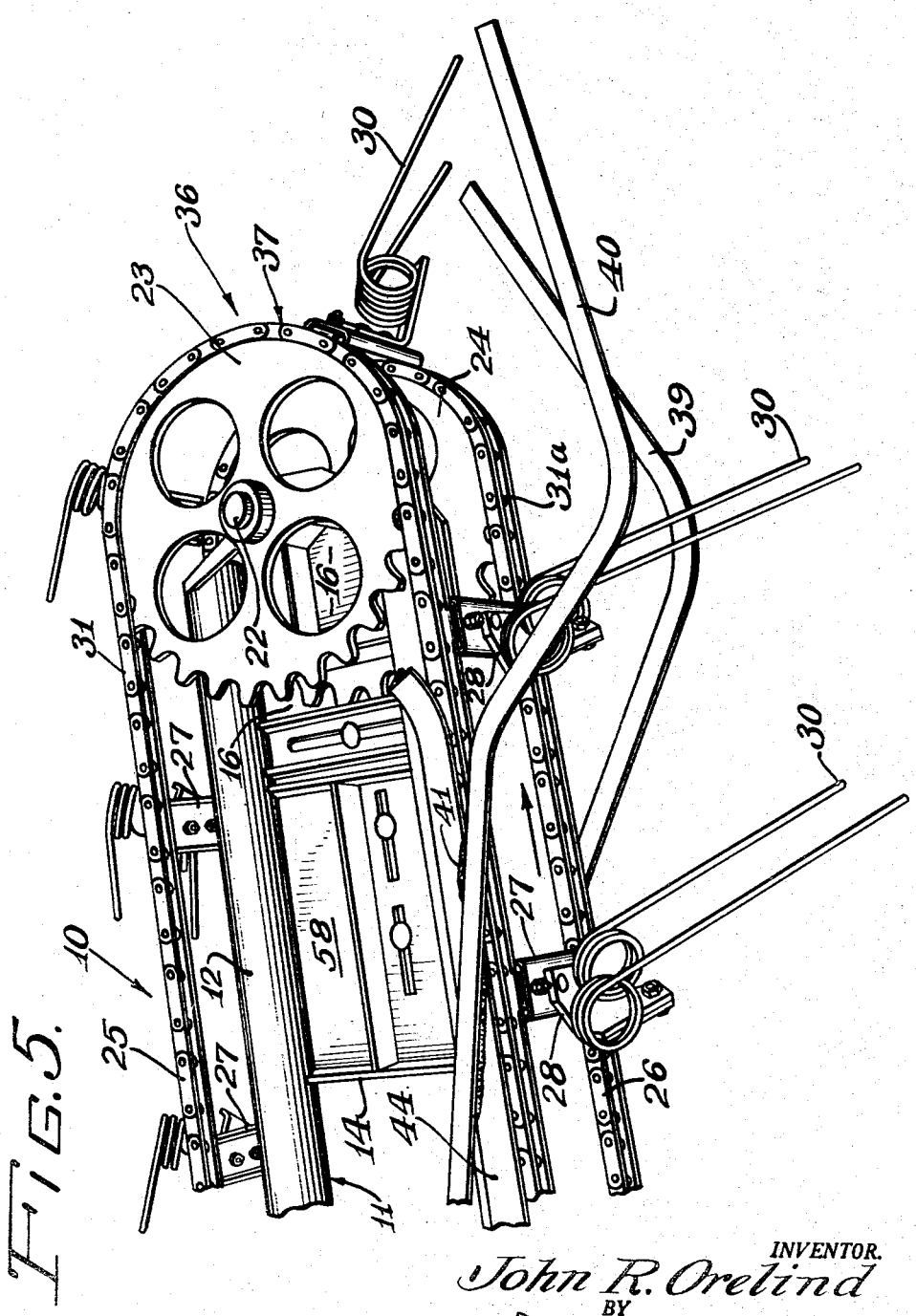
INVENTOR.
John R. Orelind
BY
Paul O. Pippel
Atty.

United States Patent Office 2,711,065
Patented June 21, 1955

2,711,065

TRACTOR MOUNTED SIDE DELIVERY RAKE

John R. Orelind, Wilmette, Ill., assignor to International Harvester Company, a corporation of New Jersey Application December 18, 1953, Serial No. 398,926

2 Claims. (Cl. 56—27)

This invention relates to hay rakes and more specifically to side delivery rakes.

A general object of the invention is to provide a novel hay rake which moves and rakes the hay into a windrow with minimum handling of the hay.

A further object of the invention is to provide a rake which may be carried from an associated tractor and the raking means thereof driven from the power take-off of said tractor.

A further object of the invention is to provide a rake comprising a longitudinal frame carrying sprockets at each end about which is trained an endless chain and the chain supporting a plurality of outstanding tines, the sprockets being positioned to dispose the chain in a plane substantially at 45 degrees to the ground and the tines being disposed at substantially 45 degrees to the plane of the chain so that the tines are positioned at substantially right angles to the ground along the raking run of the chain and substantially horizontally along the return run of the chain so that the rake occupies a minimum vertical height and at the same time the inclination of the tines obtains an efficient stripping action of the hay from the tines at the discharge end of the rake.

These and other objects of the invention will become more apparent from the specification and the drawings wherein:

Figure 5 is a fragmentary enlarged front perspective view of the discharge end of the rake.

Figure 1:
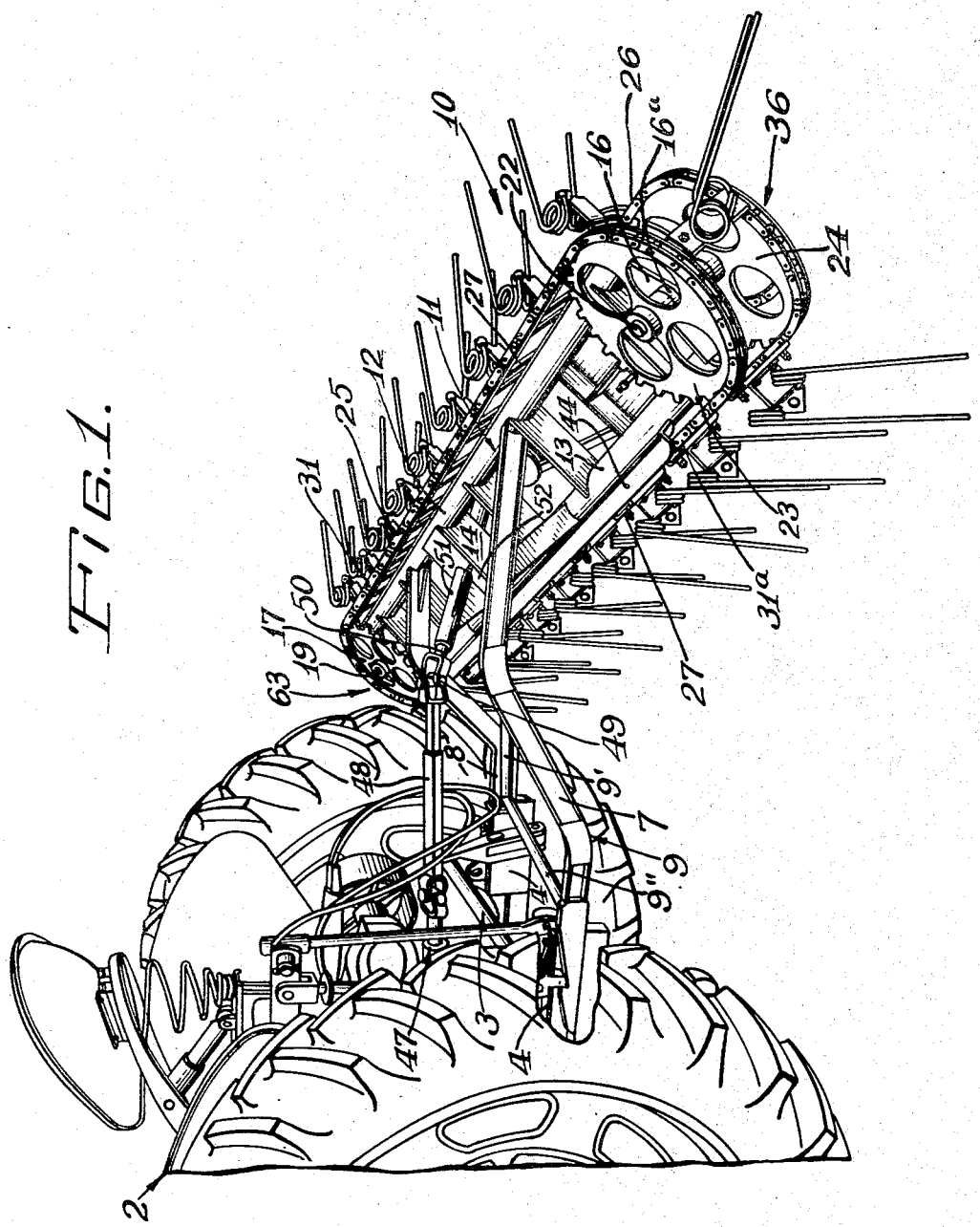
Figure 1 is a side perspective view of the novel rake shown in association with a supporting tractor.
Figure 2:
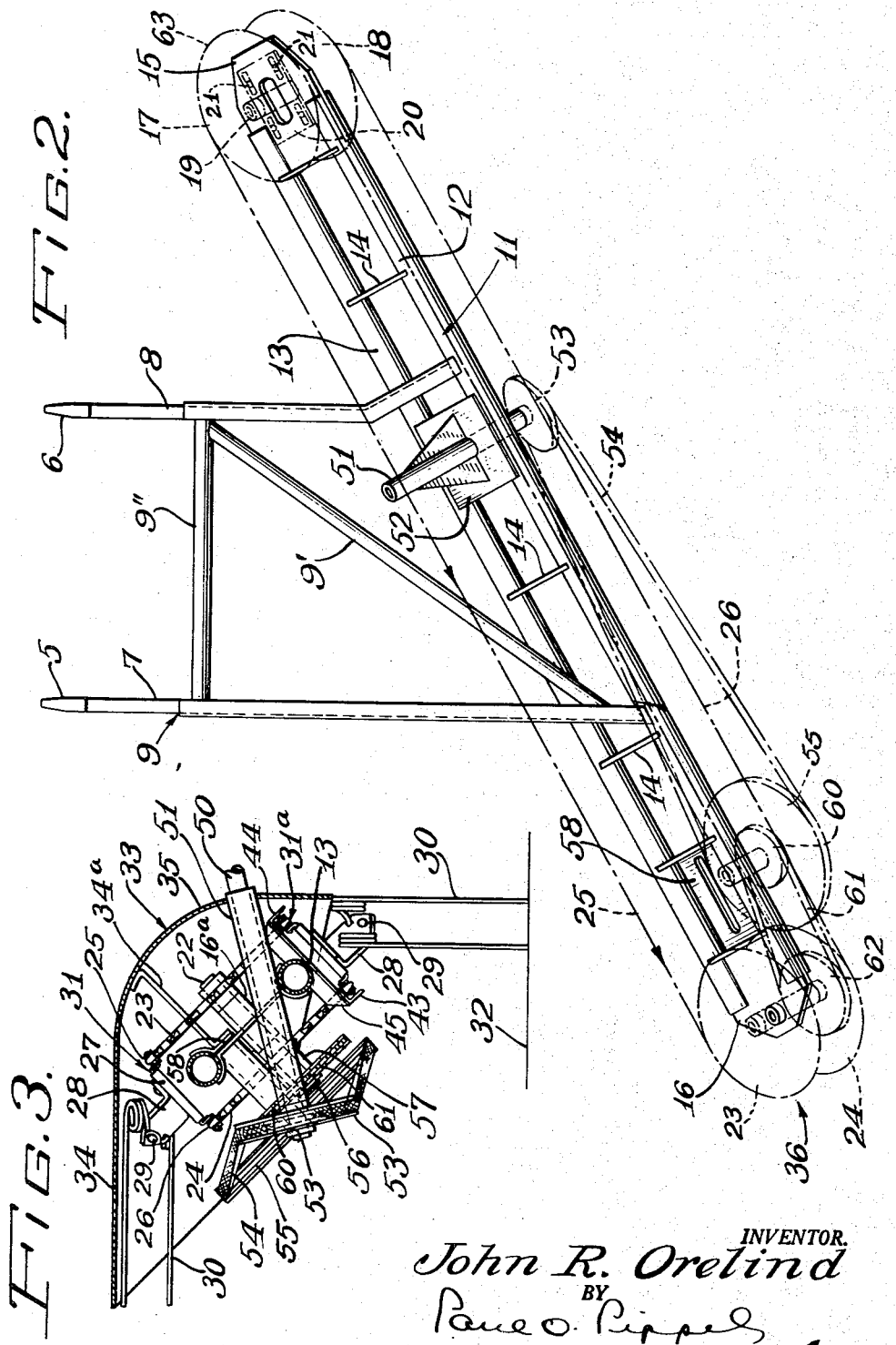
Figure 2 is a plan view of the frame work of the rake with the raking chains and associated parts diagrammatically shown in phantom lines.

Referring now to the drawings, the tractor generally designated 2 may be of conventional design and comprises at its rear end a two-point hitch assembly generally indicated 3 and more fully described in the International Harvester McCormick Farmall Super C with Fast Hitch publication No. CR-501-C. The hitch assembly 3 comprises a pair of laterally spaced sockets 4, 4 each of which receives the forward end or nose 5 or 6 of forwardly extending hitch members 7 and 8 of an implement draft frame generally designated 9 of the side delivery rake generally indicated 10.

In addition to the hitch members 7 and 8 which extend in laterally spaced generally parallel relationship, the frame 9 is provided with diagonal and perpendicular cross braces 9' and 9" connected between the members 7 and 8 and at the rear ends of the members 7 and 8 there is provided a transverse rake frame structure 11 which includes a pair of top and bottom beam members 12 and 13 which are spaced vertically and interconnected by a series of spacer plates 14, 14.

The ends of the rake frame 11 are provided with mounting plates 15 and 16 which are connected to the adjacent ends of the beam members 12 and 13. The mounting plate 15 provides a mounting for a pair of upper and lower sprockets 17 and 18 on a shaft 19 journalled in an adjustable sleeve assembly 20 which is adjustably connected as by bolts at 21, 21 to the plate 15.

Figure 3:
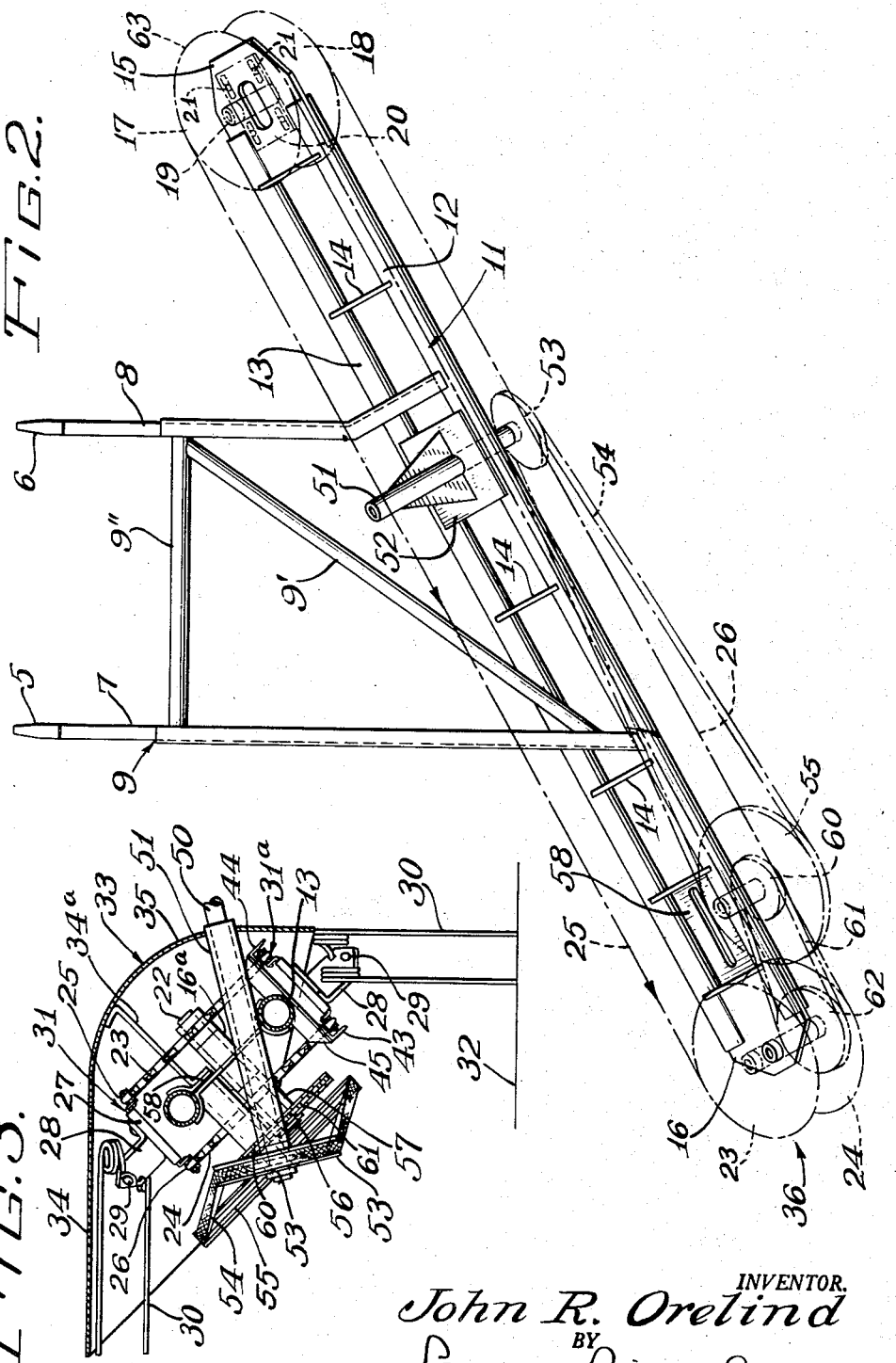
Figure 3 is an enlarged cross-sectional view of the rake taken substantially on line 3—3 of Figure 4 and showing the covering shield applied thereto.

The mounting plate 16 provides, as best seen in Figure 3, a rotatable mounting sleeve 16a for a shaft or axle 22 which at its upper and lower end is connected to upper and lower sprockets 23 and 24, said sprockets 17 and 23 being disposed substantially coplanar and the sprockets 18 and 24 being disposed coplanar in a plane generally parallel to the plane of the sprockets 17 and 23 oriented in planes extending forwardly downwardly at substantially 45° to the ground, and the upper ends of the axis of shafts 19 and 22 being inclined 45° forwardly from the vertical.

Figure 4:
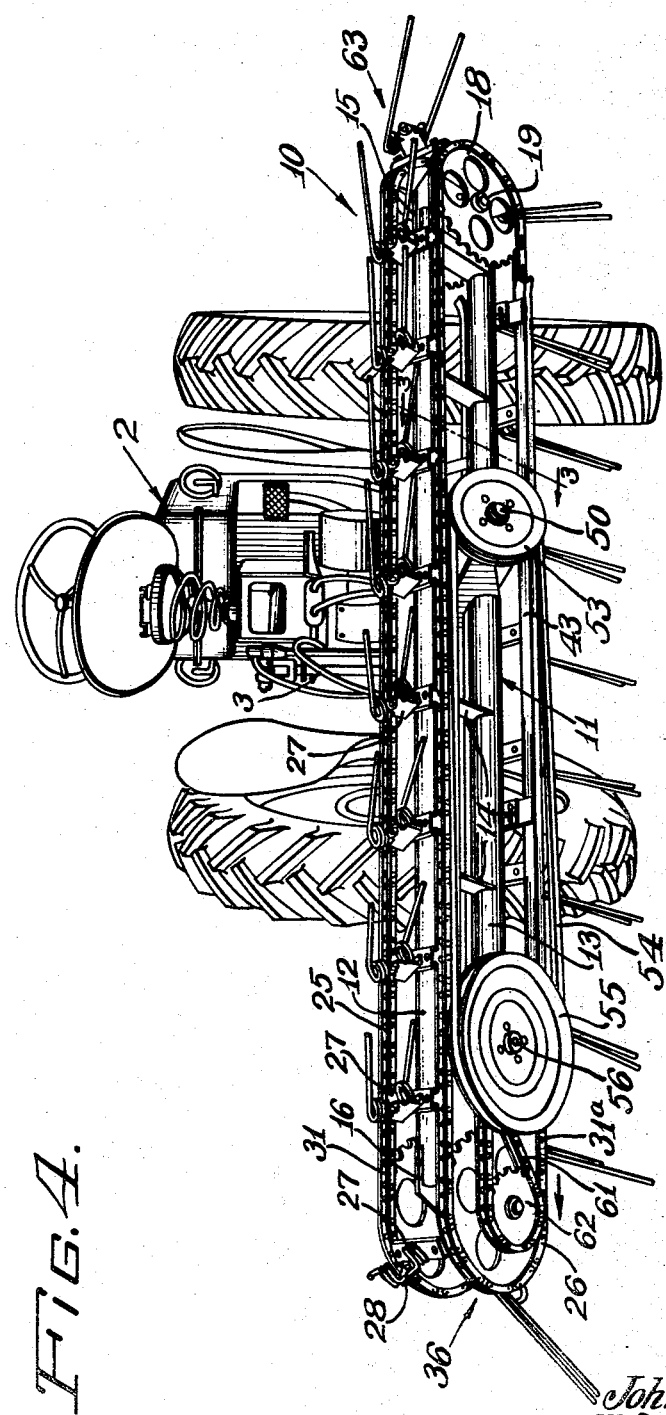
Figure 4 is a rear perspective view of the rake and supporting tractor.

The sprockets 17 and 23 have an endless chain or conveyor 25 trained thereabout and extending therebetween, similarly the sprockets 18 and 24 have an endless chain or conveyor 26 trained thereabout and extending therebetween. The chains 25 and 26 are interconnected along longitudinally spaced points by means of a plurality of transverse bars or connectors 27, 27 to the outer sides of which are connected mounting brackets 28 to which are connected as at 29 the inner extremities of spring teeth or rake teeth 30. It will be observed from a consideration of Figure 3 that the fingers 30 are so connected to the brackets 28 that the fingers extend at a 45° angle in a rearward direction from the return run indicated at 31 of the rake chains and thus are disposed substantially horizontally. It will also be seen from a consideration of Figure 3 that when the fingers 30 are in the raking or active run 31a of the rake chains they extend substantially vertically downwardly with respect to the ground which is indicated at 32 in Figure 3. This designated angular relationship between the planes of the raking teeth and planes of the actuating chains is important in properly presenting the teeth to the ground for effective raking action. It will also be observed that this feature disposes the raking teeth 30 along the return run of the chain so that they extend substantially horizontally whereby the vertical height of the rake is substantially reduced. This allows for the provision of the shield designated 33 which is compact and which may have a substantially horizontal top web 34 overlying the upper run of the rake, the front end of the web 34 being connected to a downwardly curved panel portion 35. The shield 33 may be connected to the framework 11 in any convenient manner as by a series of stand-off braces 34a connected to the members 14. The novel angular inclination of the rake teeth provides a further feature in that at the discharge end 36 of the rake, the teeth are disposed in effective self-stripping positions as best seen in Figures 4 and 5 whereat it will be noticed that the teeth as they swing from the active raking run 31a into the discharge segment 37 about the sprocket wheels 23 and 24, assume a downward rearward inclination and progressively move from the vertical disposition in the raking run 31a to the horizontal disposition along the return run 31, the hay is thus tossed by the teeth laterally and rearwardly of the discharge end of the rake.

To assist this stripping action of the hay from the teeth there are provided a pair of laterally spaced stripping fingers 39 and 40 which are mounted on the rake frame as by welding at 41, said stripping fingers being disposed outwardly of the teeth 30 and receiving the same therebetween and extending from the downstream end of the raking run of the assembly beyond the discharge end 36 of the rake in an area that effects a downward stripping component with respect to the fingers 30. It will be noted from a consideration of Figures 3 and 5 that the active runs of the chains are guided in longitudinal channels 43 and 44 which are disposed in guiding relationship to the chains 25 and 26 respectively to prevent the chains from being bowed rearwardly as the tines connected thereto to engage the hay. The channel guides 43 and 44 are interconnected by cross members 45 which are secured to the bottom of the front beam 13.

The endless chain rake is driven from the power take-off 47 of the associated tractor which drives a shaft assembly 48 which at its rear end is connected through a universal connection 49 to the forward end of a transmission shaft 50 which is journalled within a sleeve 51 which is connected to the frame members 12 and 13 intermediate their ends by a plate structure 52. The rear end of the shaft 50 is provided with a pulley 53 which is trained on a belt 54 trained about a speed reducing larger pulley 55, the pulley 55 being connected to the rear end of a countershaft 56 which is journalled in a sleeve 57 which is mounted on a plate structure 58 connected to the beam members 12 and 13 and spaced laterally of the shaft 53 intermediate the same and the discharge end of the rake. The countershaft 56 is also connected to a smaller sprocket 60 which drives a chain 61 which in turn drives a sprocket 62 which is connected to the bottom rear end of shaft 22 of sprockets 23 and 24 and driving the same.

It will be appreciated that the rake chains are rotated in directions shown by the arrows in the various views in order to move the cut hay from the leading end 63 of the rake to its trailing end 36 and is disposed and angled to the direction of travel of the implement in order to achieve a transverse component on the hay substantially at right angles to the direction of travel of the machine.

It will be further appreciated that vertical adjustment of the rake is effected through the two-point hitch assembly and that the control and regulation of the rake is effected in the usual manner by controlling the operation of the power take-off drive.

What is claimed is:

1. In combination with a tractor having a power take-off and lifting hitching means, a rake disposed in rearwardly overhanging relationship to the tractor comprising a draft frame including a pair of laterally spaced fore and aft extending members having forward ends connected to said hitching means for sole support thereby, a transversely elongated rake frame connected intermediate its ends to the rear ends of said members and solely supported from said draft frame off the ground, sprocket means rotatably mounted at opposite ends of said rake frame, an endless hay conveyor having outwardly extending fingers and trained around and extending between said sprocket means, power transmitting means connecting said power take-off and one of said sprockets, said rake frame and conveyor disposed at an obtuse angle to the direction of travel and one of said members being shorter than the other, a rigid beam interconnecting said members intermediate their ends, and a diagonal beam extending between and connected to the rear end of said other member and to said beam adjacent to its connection to said shorter member.

2. A side delivery hay rake comprising a draft frame including a pair of fore and aft extending attaching members having forward ends for connection to a tractor hitch, a generally horizontally extending transverse rake frame rigidly connected intermediate its ends to corresponding rear ends of said members, mounting means at opposite ends of said rake frame comprising a pair of axles sloping upwardly at a forty-five degree forward inclination, a pair of upper and lower sprockets connected to each axle, endless chains trained about and extending between said upper sprockets and said lower sprockets, respectively, and having active and return runs, said runs disposed in planes generally parallel to the common axial plane of both of said axles, a plurality of transverse bars interconnecting said chains, relatively straight rake teeth connected to said bars intermediate said chains and disposed at a forty-five degree angle to said planes and extending substantially vertically downwardly in said active run and substantially horizontally in said return run, and driving means operatively connected to at least one of said axles.

References Cited in the file of this patent

UNITED STATES PATENTS

| 2,494,946 | Ingram | Jan. 17, 1950 |
| 2,511,100 | Clark | June 13, 1950 |
| 2,554,719 | Pettitt | May 29, 1951 |
| 2,605,599 | Curry | Aug. 5, 1952 |

FOREIGN PATENTS

| 388,484 | Germany | Jan. 19, 1924 |